United States Patent [19]
Allen

[11] 3,777,342
[45] Dec. 11, 1973

[54] METHOD OF ASSEMBLING VALVE

[75] Inventor: Herbert Allen, Houston, Tex.

[73] Assignee: Cameron Iron Works, Inc., Houston, Tex.

[22] Filed: Jan. 24, 1973

[21] Appl. No.: 326,542

Related U.S. Application Data

[62] Division of Ser. No. 184,727, Sept. 29, 1971, Pat. No. 3,732,885.

[52] U.S. Cl. ............................................. 29/157.1
[51] Int. Cl. .......................................... B21d 53/00
[58] Field of Search ................... 29/157.1; 137/315, 137/246.22; 251/148, 174, 315, 316, 367

[56] References Cited
UNITED STATES PATENTS

| | | | |
|---|---|---|---|
| 2,890,017 | 6/1959 | Shofer | 251/367 X |
| 3,155,368 | 11/1964 | Shofer | 29/157.1 R UX |
| 3,235,226 | 2/1966 | Allen | 251/315 X |
| 3,263,312 | 8/1966 | Shofer | 29/157.1 R |
| 3,545,721 | 12/1970 | Shofer | 251/315 X |
| 3,657,783 | 4/1972 | Ellis | 29/157.1 R |
| 3,666,237 | 5/1972 | Piccardo | 251/367 |
| 3,678,556 | 7/1972 | Shofer | 29/157.1 R |

Primary Examiner—J. Spencer Overholser
Assistant Examiner—Ronald J. Shore
Attorney—Marvin B. Eickenroht

[57] ABSTRACT

A valve having seats made of axially separable, inner and outer parts which may be moved to positions, during assembly of the valve, permitting adjacent parts of the valve body to be welded and the weldments to be stress relieved without damage to seal rings carried by the seats.

22 Claims, 10 Drawing Figures

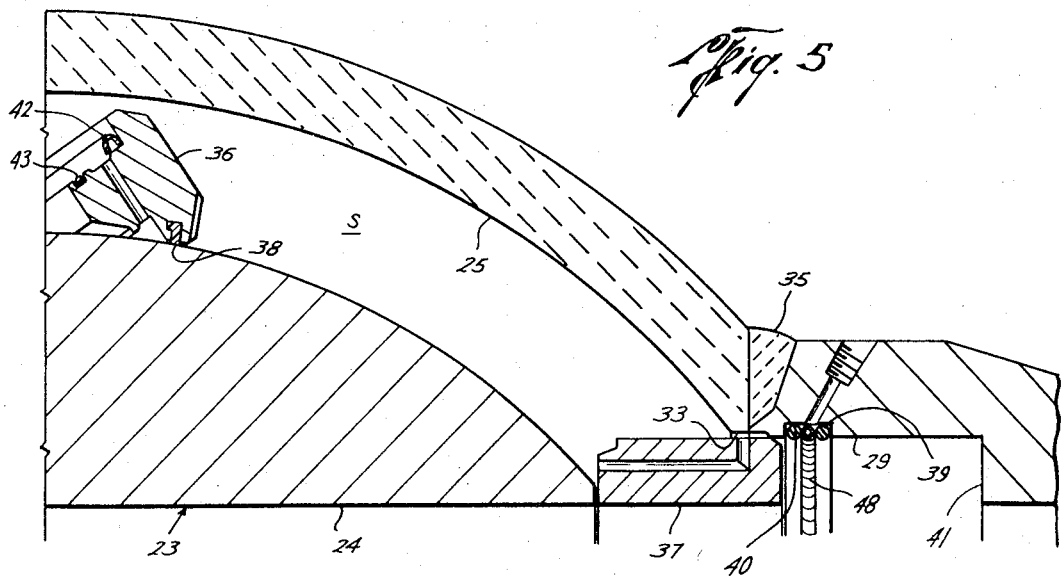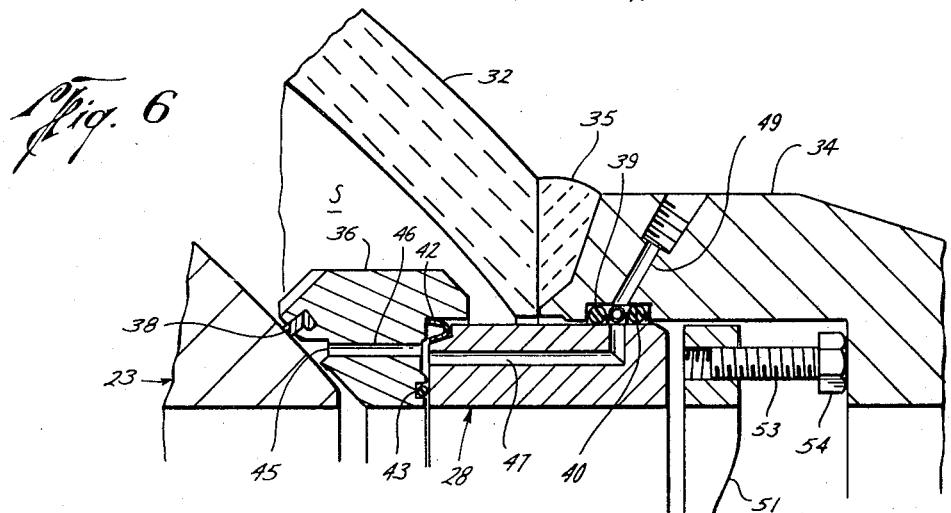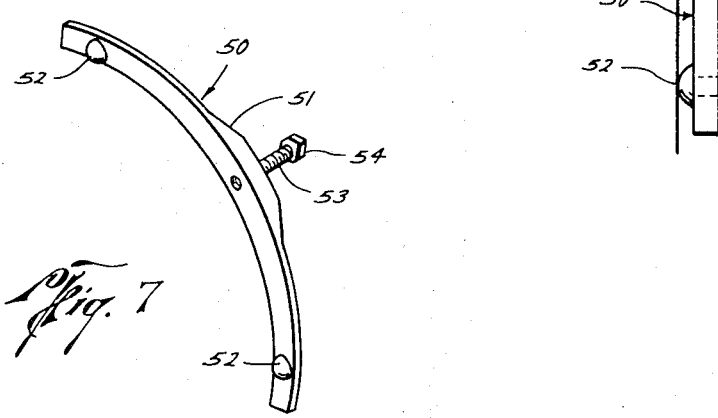

METHOD OF ASSEMBLING VALVE

This is a division of application Ser. No. 184,727, filed Sept. 29, 1971 now U.S. Pat. No. 3,732,885.

This invention relates generally to valves. More particularly, it relates to improvements in valves of the type shown in U.S. Pat. No. 3,315,697, wherein separate parts of a central portion of the valve body are welded along their longitudinal edges to capture a closure member therein for rotation between open and closed positions and form a chamber about the closure having openings in each side. A seat is mounted within a tubular portion of the body which is joined by a girth weld to the central portion thereof in surrounding relation to each of the openings.

As shown in the aforementioned patent, a seal ring is carried on the inner end of the seat to engage the closure, and another seal ring is arranged between the outer diameter of the seat and the tubular body portion to seal between them. Since the seat extends through the side opening in the central body portion, the seal rings are in close proximity to the welds. Inasmuch as the heat radiating from the welding operations could ruin these metal rings, it has been proposed to circulate water around them during this time.

However, not even this procedure is adequate to protect the seal rings from the higher and more sustained temperatures incurred in stress-relieving the weldment. Furthermore, due to the disposal of the seat across the inner side of the weldment, it has been difficult to X-ray the girth weld to detect imperfections.

An object of this invention is to provide a valve of this type which may be assembled without the necessity of circulating coolant past the seal rings or other parts of the seats susceptible to damage during the welding operation.

Another object is to provide a valve of this type in which the weldments may be stress-relieved without damage to these seat parts.

A further object is to provide a valve of this type in which the girth weld may more readily be X-rayed.

Still another object is to provide a method of assembling a valve which enables one or more of the foregoing objects to be accomplished with a minimum of time, expense and effort.

These and other objects are accomplished, in accordance with the illustrated embodiments of the invention, by a valve in which the seal rings or other parts of the seat susceptible to damage by the welding and related operations may, despite their capture within the valve body, be arranged in positions within the valve body remote from the weld area during such operations and then, upon completion thereof, moved within the valve body to the positions they normally occupy near such area for engaging between the valve body and closure member. Thus, each seat comprises separable inner and outer annular parts, with the inner part normally engaging between the closure member and outer seat part and the outer seat part normally engaging between the inner seat part and the tubular body portion. The closure member and central body portion are so spaced that the inner seat part, when separated from the outer seat part, may be arranged between them in its remote position and then moved between them to its normal position. The outer seat part is slidable longitudinally within a recess in the tubular portion so that, when separated, it may be arranged in its remote position by being slid away from the closure member and then slid back toward the closure member to its normal position.

The inner seat part may carry a seal ring on its inner end which engages the ball closure, and the outer part is axially slidably mounted within and sealed with respect to a recess in the tubular body portion by a seal ring arranged between them. The inner and outer seat parts are sealed with respect to one another by a seal ring between them, and the seat is yieldably urged against the closure by spring means preferably disposed in the recess outwardly of the seat. By virtue of this invention, these seal rings, as well as other portions of the seat otherwise subject to damage, are protected from the welding and related operations.

In one illustrative embodiment of the invention, wherein each opening from the chamber is smaller than the inner seat part, the inner seat part is arranged between the closure and the parts of the central body portion as the longitudinal edges of the latter are welded together. More particularly, in order to prevent damage to seal rings carried by the inner seat part, such part is arranged in a position remote from the weld and between the closure and the central body portions as they are welded together. The illustrated closure is a ball which preferably has stems on its opposite ends rotatably journaled in the central body portion as its separate parts are connected together, and each inner seat part is intermediate the stems when arranged in such remote position.

In a second illustrative embodiment of the invention, each side opening is larger than the inner seat part so that the inner seat part may be moved therethrough subsequent to welding of the separate parts of the central body portion. However, in this embodiment as well as in the first embodiment, the inner seat part may be arranged, prior to the welding of a tubular portion to the central body portion, in a position in which it is to one side of and thus remote from an opening in the chamber. In the case of the first embodiment, this requires movement of the inner seat part from its position during formation of the welds between the longitudinal edges of the central body portion. In the case of the second embodiment, the inner seat part may be moved directly into such position upon movement through a side opening.

With the inner seat part so displaced, the outer seat part is inserted into the outer end of a recess in the tubular body portion, and thus to a position remote from the area to be welded to the central body portion. The tubular portion is then welded to the central body portion and the weld is heat-treated and X-rayed. If a similar structure is to be welded to the opposite side of the central body portion, there will have been two inner seat parts displaced for the first girth weld and then repositioned for the second.

The outer seat part is then moved inwardly to permit insertion of the seal ring for sealing between the seat and the recess, whereupon the inner and outer seat parts are moved to assembled position and the spring means inserted into operative position within the recess for yieldably urging the seat parts together, and thus the inner seat part against the ball closure.

Preferably, the inner seat part includes a seal ring for sealing between the inner and outer seat parts so that when the inner seat part of the first embodiment is in its position remote from the welding of the longitudinal edges of the central body portion, it is removed from the heat thereof. Also, when the inner seat part of either embodiment is positioned to one side of the chamber opening, they are removed from the heat of the girth welding and stress-relieving operations.

In the drawings, wherein like reference characters are used throughout to designate like parts:

FIG. 5 is an enlarged sectional view of a portion of the valve of FIGS. 1 to 4, with the outer seat part moved inwardly from its position in FIG. 4 and the seal rings inserted into a groove within the recess in the tubular body portion;

FIG. 6 is a view similar to FIG. 5, but with the assembly of the valve completed;

FIG. 7 is a perspective view of a part of the spring means;

Figure 1:
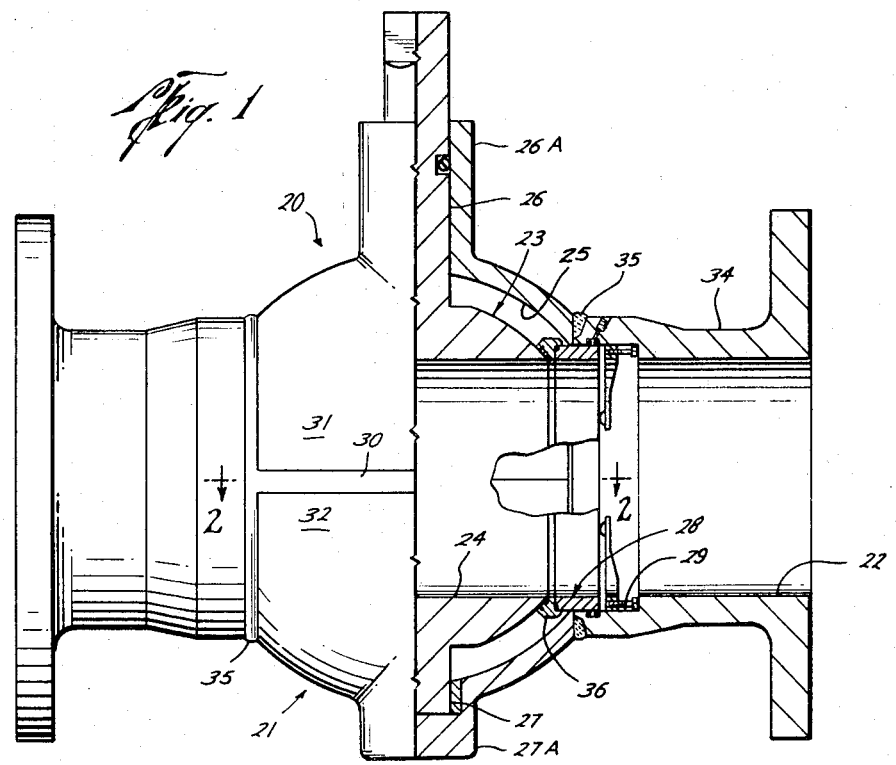
FIG. 1 is a side view, partly in section, of a ball valve assembled in accordance with the first-mentioned embodiment of the invention.

With reference now to the details of the above-described drawings, the valve made in accordance with the first embodiment of the invention, and indicated in its entirety in FIG. 1 by reference character 20, includes a valve body 21 having a flowway 22 therethrough, and a ball closure 23 having a port 24 therethrough and rotatably mounted within the valve body for selectively opening and closing the passage through the flowway. The ball closure is arranged concentrically within a spherically shaped chamber 25 intermediate the opposite cylindrical ends of the flowway and has upper and lower stems 26 and 27 journaled within bearings 26A and 27A formed in the valve body at the upper and lower sides of the chamber. The upper stem extends through a seal ring in the upper bearing and has an exterior end to which a suitable operator (not shown) may be connected for rotating the ball closure.

An annular seat 28 is slidably mounted within a annular recess 29 at each intersection of flowway 22 with chamber 25. The inner end of each seat sealably engages the ball closure, and the outer diameter of a portion of each seat is sealably slidable within its recess 28. The inner diameter of the seat forms a continuation of flowway 22. The right- and left-hand sides of the valve may be identical.

Chamber 25 is formed within a central body portion comprising upper and lower hemispherically shaped parts 31 and 32, respectively. The adjacent side edges of these parts are disposed generally longitudinally in a plane perpendicular to the axis of rotation of the ball closure, and are welded together, as indicated at 30, to mount stems 26 and 27 in bearings 26A and 27A, respectively. The connection of the parts also forms flowway openings 33 in opposite sides of the chamber. The diameter of openings 33 is less than the outer diameter of seat 28.

The valve body 20 also includes a pair of tubular portions 34 each having an inner end welded at 35 to an annular surface on the central body portion surrounding an opening 33 therein. Each seat 28 is axially slidably mounted within recess 29 extending axially outwardly from the inner end of one of the tubular portions, so that when the latter are so connected to the central body portion, the seats 28 are arranged to extend through the openings 33 and thus across the inner sides of the weldments 35.

As best shown in FIGS. 5 and 6, each seat 28 includes inner and outer, axially separable annular parts 36 and 37, interfitted so as to maintain them in axial alignment. The outer part is axially slidable within recess 29 and spring means 50, in the recess behind the outer part, urges both parts toward the ball closure. A seal ring 38 is carried on the inner end of inner seat part 36 for sealably engaging the ball closure, a pair of seal rings 42 and 43 are carried on the outer end of seat part 36 for sealably engaging the inner end of outer seat part 37, and a pair of seal rings 39 in a groove 40 in recess 29 seams between outer seat part 37 and the recess.

The space S between the closure and chamber permits the inner part of each seat to be arranged in a position to one side of opening 33, so that, as shown in FIG. 5, the outer seat part 37 may be moved axially within recess 29 to an innermost position in which it extends through opening 33 to engage the ball closure, as shown in FIG. 5. Prior to insertion of spring means 50, the outer seat part may be moved to an outer position (not shown) in which it is also within opening 33, but spaced from the ball closure a sufficient distance to permit the inner seat part 36 to be moved from its position of FIG. 5 into the position of FIG. 6 and thus into axial alignment with the outer seat part. More particularly, the outer seat part 37 may be moved axially outwardly to the position shown in FIG. 4, in which position its inner end is disposed axially outwardly from the opening 33 and thus the inner side of the weldment 35. Then, of course, with the inner seat part 36 in its position of FIG. 6, the outer seat part 37 may be moved axially inwardly into interfitting relation with the inner seat part, and, when the seat parts are so interfitted, they are sealed with respect to one another by the seal rings 42 and 43.

Figure 2:
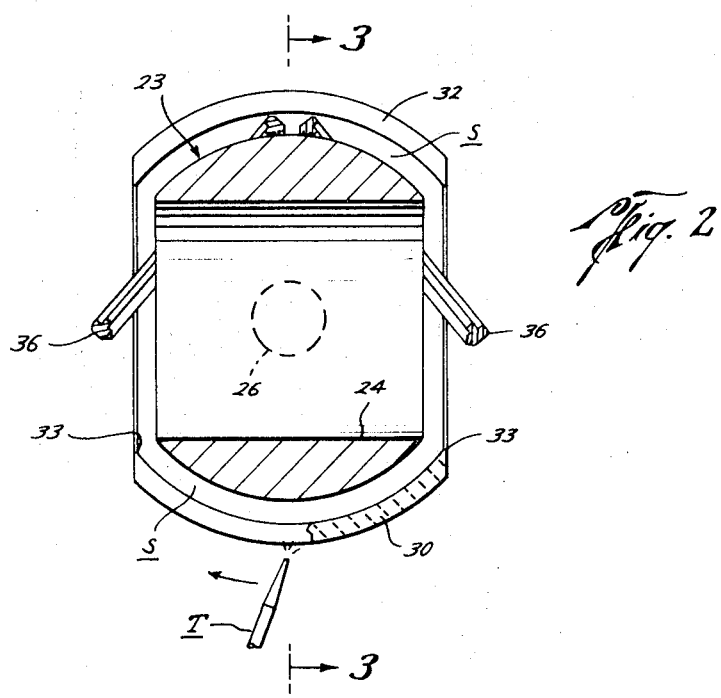
FIG. 2 is a sectional view of the valve, as seen along broken line 2—2 of FIG. 1, during welding of a longitudinal edge along one side of the central body portions, and with the inner seat parts in positions remote therefrom.

To assemble the valve, the inner seat parts 36 are placed between the ball closure and the upper and lower parts 31 and 32 of the central body portion as the latter are moved into positions about the ball closure preparatory to welding one pair of longitudinal edges as at 30. As shown in FIG. 2, parts 36 are arranged in positions within the space S remote from each weldment, and thus in positions in which heat from the weldment will not damage the seal rings carried by the inner seat parts. The edges are welded by a torch T and the weldment may also be stress-relieved. Parts 36 are then moved to the other side of the closure and the other pair of longitudinal edges is welded.

Figure 3:
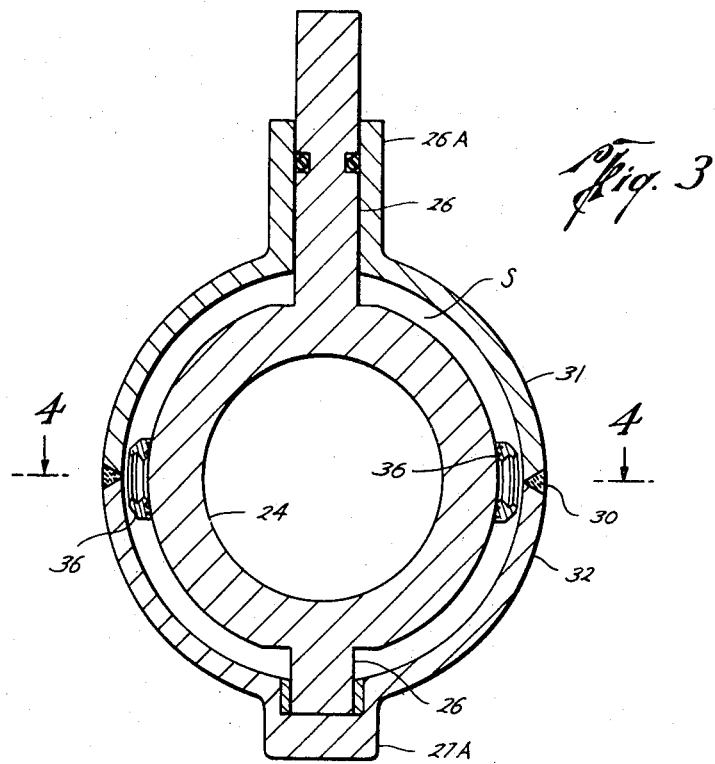
FIG. 3 is a sectional view of the valve as seen along broken line 3—3 of FIG. 2, showing the longitudinal edges welded and the inner seat parts moved to positions preparatory to formation of one of the girth welds.
Figure 4:
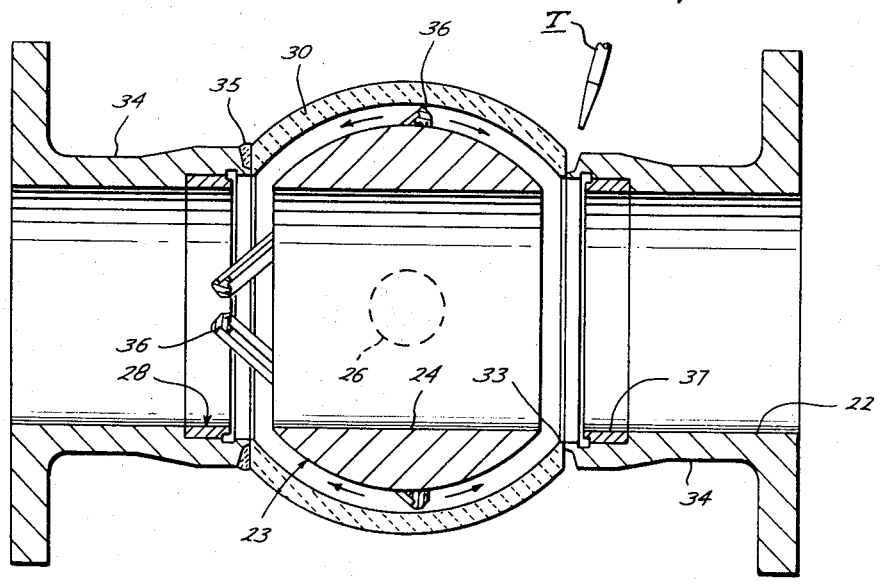
FIG. 4 is a sectional view of the valve as seen along broken line 4—4 of FIG. 3, during formation of such girth weld.

Preparation is then made for welding a tubular body portion 34 to the central body portion about one of the openings 33 by a girth weld 35. The inner seat parts may be moved within the space S into the position shown in FIGS. 3, 4 and 5, which, in effect, involves turning one of them approximately 180° from the position it occupied during formation of a weld 30. An outer seat part 37 is inserted in the inner end of a tubular body portion which is then juxtaposed with the annular surface of the central body portions to which it is to be welded, as shown in FIG. 4. The outer seat part is preferably in its axially outermost position. A girth weld 35 is then formed, as by means of a welding torch T, and subsequently stress-relieved in any conventional manner. With the outer seat part in the position shown in FIG. 4, the X-ray gun is able to take a clear picture of the weld 30 without interference with extraneous material cross its inner side. The other tubular body portion may be assembled in similar fashion.

Upon completion of welding-related operations, outer seat part 37 is moved inwardly to the position of FIG. 5, to uncover groove 40 in recess 29 and thus permit seal rings 39 to be inserted through the tubular body portion and into such grooves. Seal rings 39 are resilient and may be collapsed for insertion through the tubular body portion. When so inserted, the seal rings are located for sealing between the tubular body portion and the outer seat part 37 when the latter is moved outwardly into the position of FIG. 6.

Lubricant from an external source is supplied to a groove 45 about the inner end of the seat radially inwardly of the seal ring 38. For this purpose, each of the inner and outer seat parts is provided with a series of ports 46 and 47, respectively, connecting the groove 45 in the inner seat part with the groove 40 in which the seal rings 39 are arranged. These seal rings are held apart by a coil spring 48 disposed between them so as to sealably engage the outer diameter of outer seat part 37 on opposite sides of the groove 47, and seal rings 42 and 43 are so mounted on the outer end of the inner seat part 36 as to seal between the inner seat part and outer seat part radially outwardly and inwardly, respectively, of the intersecting ports 46 and 47. Thus, lubricant fed from a suitable source through a port 49 in the tubular valve body portion is confined for flow into the groove 47 and thus into the groove 45. of course, the coil spring 48 may be collapsed in much the same manner as the seal rings 39 to permit it to be inserted through the tubular body portion. With outer seat part 37 moved outwardly a sufficient distance, the inner seat part 36 is swung into the position of FIG. 6. Then the outer seat part is moved inwardly into interfitting relation therewith, as shown in FIG. 6, in which position seal rings 39 seal between the outer seat part and recess 29.

Spring means 50 is then inserted through the tubular body portion and into the recess 29 axially outwardly of the outer seat part. Several such springs are well known in the art. As illustrated, spring 50 comprises a plurality of spring segments 51 each comprising an arcuate arm having a button 52 at its opposite ends for engaging the outer end of the outer seat part, and a screw 53 threadedly carried intermediate the buttons. With all segments in place within the recess, the screws are extended to cause heads 54 to abut the end 41 of the recess and thus permit a desired force to be transmitted to the outer seat part.

Figure 8:
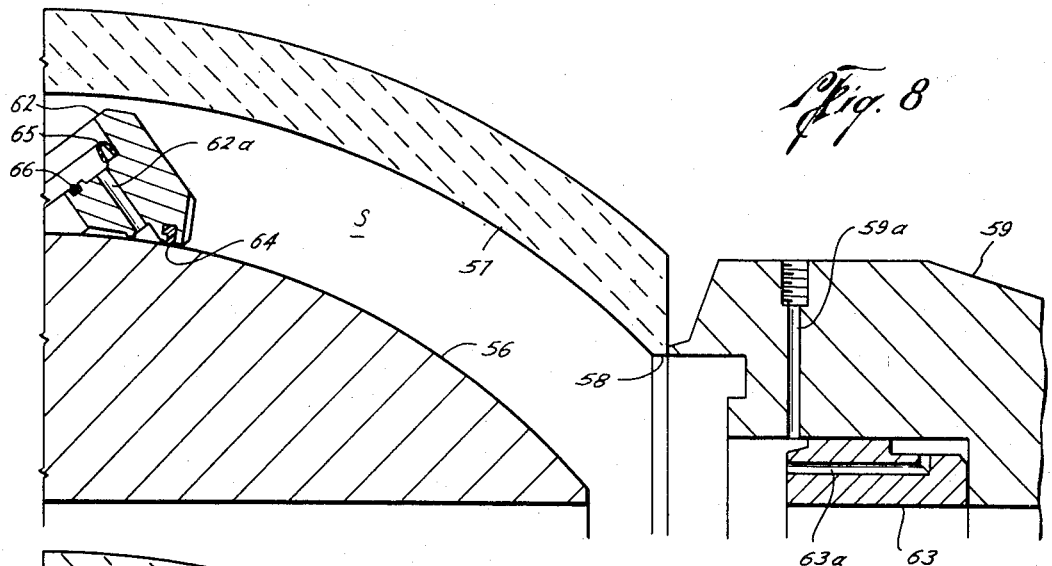
FIG. 8 is an enlarged sectional view of a portion of a valve during assembly in accordance with the second-mentioned embodiment of the invention, wherein the inner seat part has been moved through the chamber opening and into a position remote from the area thereabout to be welded.
Figure 9:
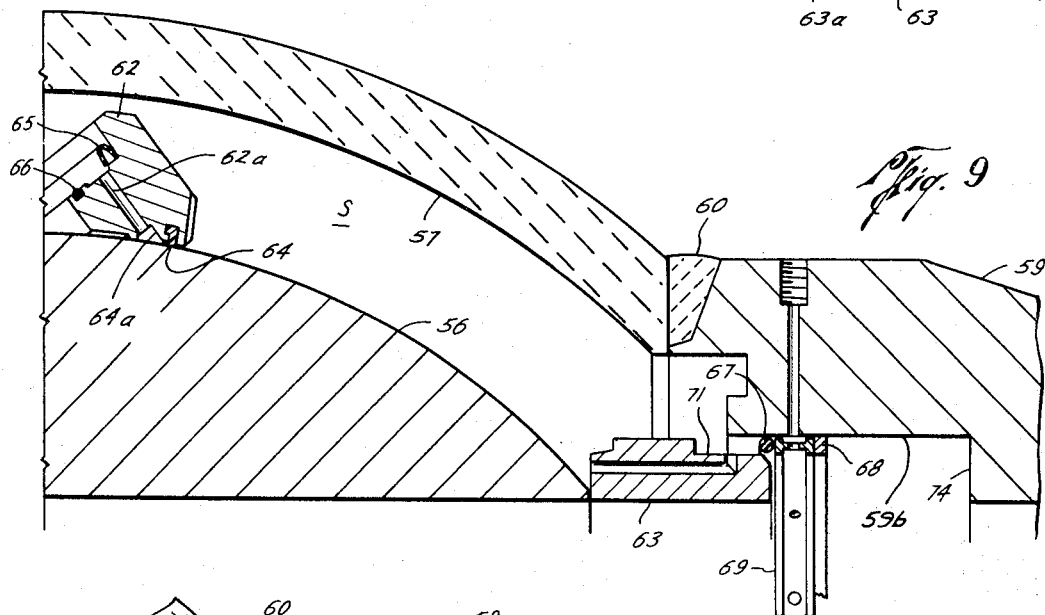
FIG. 9 is a view similar to FIG. 8, but upon completion of the weld and movement of the outer seat part inwardly to facilitate installation of seal rings.
Figure 10:
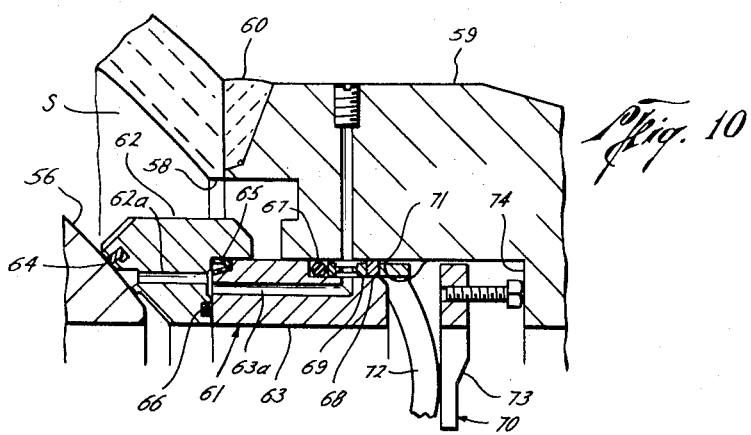
FIG. 10 is a view similar to FIG. 9, but with the assembly of the valve completed.

The second embodiment of the invention is much like the first in that, as illustrated in part in FIGS. 8 to 10, it is also made up of a valve body having a central portion comprised of upper and lower parts connected together along adjacent longitudinal edges which lie generally within a plane pernepdicular to the axis of rotation of a ball closure 56 and which form a chamber 57 in which the ball closure 56 is concentrically arranged and define openings 58 in opposite sides of the chamber. Also, the inner end of a tubular body portion 59 is welded at 60 to an annular surface of the tubular body portion surrounding each of the openings 58; and, after assembly of the valve (FIG. 10), a seat 61 is axially slidably mounted within a recess 59b extending outwardly from the inner end of the tubular body portion and having an outer end 74, so as to extend through the opening 58 and engage at its inner end the ball closure 56.

As in the first embodiment, the seat 61 includes an inner part 62 which is axially separable from and interfittable with an outer seat part 63. Inner seat part 62 carries a seal ring 64 on its inner side for sealably engaging the ball closure, and seal rings 65 and 66 on its outer end for sealably engaging the inner end of the outer seat part 63 when the seat parts are interfitted. Seal rings 67 and 68 are arranged between the outer diameter of the outer seat part 63 and the recess 59b to form a seal therebetween. The last-mentioned seal rings are held apart by a spacer 69 so as to seal on opposite sides of a lubricant port 59a in the tubular body portion 59 and 63a in the outer seat part 63, and the seal rings 65 and 66 seal on opposite sides of port 63a and a port 62a in the inner seat part 62. Thus lubricant from an external source may be supplied to a groove 74a on the inner end of the inner seat part.

Spring means 70 is arranged within the recess 59b axially outwardly of the outer seat part 63 for urging the outer seat part and thus the inner seat part toward the ball closure 56. Spring means 70 also includes wavy spring segments 72 whose inner side engages the outer side of seal ring 68, and whose outer undulations are engaged by a segmented spring 73 similar to that shown at 50 in FIG. 6. Seal rings 67 and 68 are arranged on a reduced diameter portion 71 about the outer end of the outer seat part.

In this second embodiment of the invention, the openings 58 in the sides of the central body portion are larger than the outer diameters of inner seat parts 62, to that it's not necessary to arrange the latter between the separate parts of such body portions as they are welded together. However, as in the first embodiment of the invention, in preparation for making girth weld 60, the inner part 62 of each seat is movable within annular space S between the closure member 56 and the wall of chamber 57. Thus, the inner seats may be moved through chamber opening 58 and arranged in the positions corresponding to those illustrated in FIG. 4. Thus seal rings 64, 65 and 66 carried thereon are remote from the heat of welding and stress-relieving.

The remaining assembly operations will be obvious from the description given of the first embodiment.

From the foregoing it will be seen that this invention is one well adapted to attain all of the ends and objects hereinabove set forth, together with other advantages which are obvious and which are inherent to the apparatus and method.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In a method in which a valve body is welded in an area near that normally occupied by a seat part captured within the body, the steps of arranging the seat part in a position within the body which is remote from said area, welding said body in said area while the seat part is so arranged, and then moving said seat part to the position it normally occupies.

2. In a method of the character defined in claim 1, wherein the seat part includes a rigid body and a seal ring.

3. In a method of assembling a valve wherein portions of a valve body are welded to one another to capture a closure member and part of a seat, and the seat part normally occupies aposition near the area of the body to be welded, the steps of arranging the seat part in a position within the valve body which is remote from said area, welding said body portions to one another while the seat part is so arranged, and then moving said seat part to the position it normally occupies.

4. In a method of the character defined in claim 3, wherein the seat part comprises a rigid body and a seal ring.

5. In a method of the character defined in claim 2, wherein the entire seat is captured within the body portions, and said seat part is separated from the remainder of the seat for arrangement in said position.

6. In a method of assembling a valve wherein a closure member is captured within a central body portion and a tubular body portion is welded to the central portion to surround an opening from the central body, and a seat mounted in the tubular body portion extends through the opening to engage the closure member, the steps of separating one part of the seat from the remainder thereof and arranging it in a position within the valve body which is remote from the area to be welded, welding said tubular portion to said central portion while said seat part is so arranged, and moving said seat part to a position in which it may be engaged with the other seat part for extension through said opening.

7. In a method of the character defined in claim 6, including the step of stress-relieving the weld while said seat part is in its remote position.

8. In a method of the character defined in claim 6, including the step of X-raying the weldment while said seat part is in its remote position.

9. In a method of the character defined in claim 6, wherein the seat part is on the inner end of the seat for engaging the closure member and is arranged and moved between said closure member and central body portion.

10. In a method of the character defined in claim 6, wherein the seat part is on the outer end of the seat for sliding within the tubular body portion toward and away from the closure member.

11. A method of assembling a ball valve, comprising the steps of connecting separate parts of a central body portion about a ball closure to form a chamber having an opening in the side thereof and to mount the closure within the chamber for rotation between opened and closed positions, arranging a first annular seat part in a position between the ball closure and central body portion to one side of said opening, mounting a second annular seat part for sliding axially within an annular recess in the inner end of a tubular body portion, welding the inner end of the tubular body portion to the central body portion about the opening therein, while the first seat part is in its position to one side of said opening, moving said first seat part between the ball closure and central body portion into another position in which it is aligned with said opening and the second seat part, moving the seat parts into interfitting relation with one another, and inserting a means through the outer end of the tubular portion for yieldably urging said second part against the first seat part and said first seat part against the ball closure.

12. A method of the character defined in claim 11, including the step of moving the outer seat part outwardly within the recess prior to welding the tubular body portion to the central body portion.

13. A method of the character defined in claim 11, including the step of connecting the separate parts by welding each side edge along a plane generally perpendicular to the axis of rotation of the ball closure with the first seat part arranged in a position between the ball closure and the central body portion remote from said side edge.

14. A method of the character defined in claim 11, including the step of moving said first seat part through said opening in order that it may be arranged in said position between the closure member and central body portion to one side of said opening.

15. A method of the character defined in claim 11, including the step of providing said first seat part with a seal ring mounted thereon to form an annular seal between said seat parts when they are interfitted and said second seat part is yieldably urged against said first seat part.

16. A method of the character defined in claim 11, including the step of inserting a seal ring through the outer end of the welded tubular body portion into a position within the recess for sealing between said recess and the second seat part.

17. A method of the character defined in claim 16, wherein said seal ring is inserted into a groove in said recess when said second seat part is moved toward the ball closure to permit access to the groove.

18. A method of the character defined in claim 17, including the step of moving the second part inwardly toward said ball closure to permit access to the groove prior to movement of the first seat part into the position in which it is aligned with said opening, and then moving the second seat part outwardly to permit the first seat part to be moved into said aligned position, whereby said seat parts may be moved into interfitting relation.

19. A method of the character defined in claim 11, wherein the ball closure has stems on its opposite ends which are rotatably journaled in the central body portion upon connection of its separate parts, and the first seat part is intermediate said stems when arranged in its position to one side of said opening.

20. A method of assembling a ball valve, comprising the steps of connecting searate parts of a central body portion about a ball closure to form a chamber having a pair of openings therein and to mount the closure within the chamber for rotation between opened and closed positions, arranging a pair of first annular seat parts between the ball closure and central body portion, mounting each of a pair of second annular seat parts for sliding axially within an annular recess in the inner end of a tubular body portion, welding the inner end of each tubular body portion to the central body portion about an opening therein, while each of said first seat parts is in a position to one side thereof, moving each said first seat part between the ball closure and central body portion into another position in which it is aligned with an opening and a second body part, moving each pair of first and second seat parts into interfitting relation with one another, and inserting a means through the outer end of each tubular portion for yieldably urging said second part against the first seat part with which it is interfitted and said first seat part against the ball closure.

21. A method of the character defined in claim 20, including the step of connecting the separate parts by welding their side edges together along a plane generally perpendicular to the axis of rotation of the ball closure with each of the first seat parts arranged in a position between the ball closure and the central body portion which is remote from each side edge as it is welded.

22. A method of the character defined in claim 20, wherein the ball closure has stems on its opposite ends which are rotatably journaled in the central body portion upon connection of its separate parts, and each first seat part is intermediate stems when arranged in its position to one side of said one opening.

* * * * *